(12) United States Patent
Stoffel et al.

(10) Patent No.: US 6,458,195 B1
(45) Date of Patent: Oct. 1, 2002

(54) USE OF HYDROLYZED REACTIVE RED 23

(75) Inventors: John L Stoffel, San Diego, CA (US); Peter C. Morris, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 78 days.

(21) Appl. No.: 09/772,255

(22) Filed: Jan. 26, 2001

(51) Int. Cl.$^7$ .................. C09D 11/02; C09B 45/18; C09B 62/012
(52) U.S. Cl. ............... 106/31.51; 534/629; 534/724
(58) Field of Search ............... 106/31.51; 534/629, 534/724

(56) References Cited

U.S. PATENT DOCUMENTS

| | | | | |
|---|---|---|---|---|
| 3,457,252 A | * | 7/1969 | Meininger | 534/629 |
| 3,462,409 A | * | 8/1969 | Meininger | 534/629 |
| 4,125,368 A | * | 11/1978 | Stingl et al. | 534/629 |
| 5,074,914 A | * | 12/1991 | Shirota et al. | 106/31.51 |
| 5,102,459 A | * | 4/1992 | Ritter et al. | 106/31.36 |
| 5,725,641 A | | 3/1998 | MacLeod | |
| 6,265,554 B1 | * | 7/2001 | Lehmann et al. | 106/31.51 |

FOREIGN PATENT DOCUMENTS

| | | | |
|---|---|---|---|
| EP | 0312004 A2 | 10/1987 | |
| EP | 277624 A2 | 8/1988 | |
| EP | 0366121 | 5/1990 | ........... C09D/11/00 |
| EP | 0662499 | 7/1994 | ........... C09D/11/10 |
| EP | 1086993 A1 | 3/2001 | |
| EP | 1086999 A2 | 3/2001 | |
| EP | 1170337 A2 | 1/2002 | |
| JP | 62-190275 AB | 8/1987 | |
| JP | 1123866 A | 5/1989 | |
| WO | WO00/46309 | 8/2000 | ........... C09B/67/22 |

\* cited by examiner

*Primary Examiner*—Helene Klemanski

(57) ABSTRACT

Reactive Red 23 magenta dye that is hydrolyzed to produce a passivated form having improved lightfastness in inkjet ink.

8 Claims, No Drawings

USE OF HYDROLYZED REACTIVE RED 23

FIELD OF INVENTION

The present invention generally relates to ink-jet printing, and in particular to a specific form of Reactive Red 23 magenta dye which is hydrolyzed to produce a passivated form with better pH stability thus improving kogation, decap and lighffastness.

BACKGROUND OF INVENTION

The use of inkjet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality. In general, ink-jet print quality still falls short of that produced by more expensive technologies such as photography and offset or gravure printing. A surge in interest in ink-jet imaging (e.g., the rendition of pictures) has resulted in the need to produce near photographic quality printed images at a reasonable cost. The challenge remains to further improve the image quality and lighffastness of ink-jet printed images, especially images containing skin tones, without increasing their cost.

If such an ink is to be used in an ink-jet printing device, characteristics such as crusting, long-term stability, and materials compatibility must also be addressed. If the ink is to be used in a thermal ink-jet printer, the further constraint of being thermally stable (kogation-resistant) is added.

In general, a successful ink set for color ink-jet printing must be compatible with the ink-jet pen and printing system. Some of the required properties for the ink-jet ink include: good crusting resistance, good stability, the proper viscosity, the proper surface tension, little color-to-color bleed, rapid dry time, no negative reaction with the vehicle, high solubility of the dyes in the vehicle, consumer safety, low strike through, high color saturation, and good dot gain. Color ink-jet printers typically use three inks of differing hues: magenta, yellow, and cyan. Optionally black is also used. EP 662499 and EP 366121 both assigned to Canon disclose the use of Reactive Red 23 in inkjet ink.

SUMMARY OF THE INVENTION

The present invention relates to a high lightfastness magenta dye comprising hydrolyzed Reactive Red 23 with from 0 to 100% hydroxy form and from 0 to 100% vinyl form:

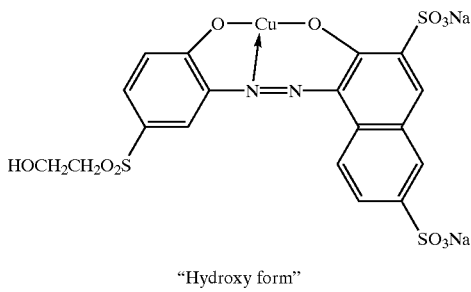

"Hydroxy form"

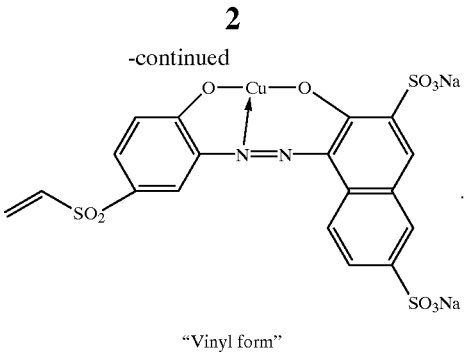

"Vinyl form"

The present invention further relates to a set of ink-jet inks for ink-jet printing, at least one of the inks being a magenta ink comprising a high lightfastness magenta dye, the high lightfastness magenta dye comprising hydrolyzed Reactive Red 23 with from 0 to 100% hydroxy form and from 0 to 100% vinyl form:

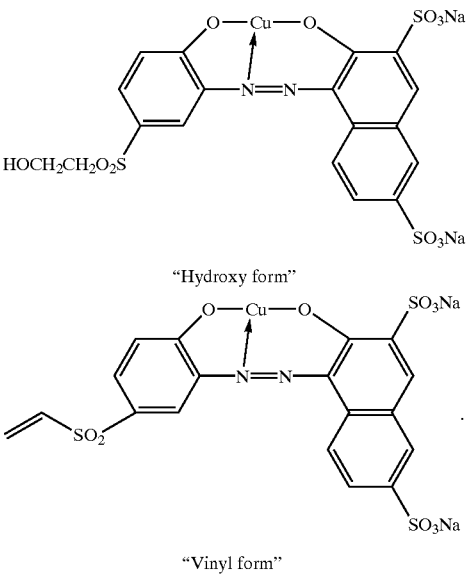

"Hydroxy form"

"Vinyl form"

The present invention additionally relates to a method of making a passivated form of Reactive Red 23 comprising hydrolyzing Reactive Red 23 to obtain hydrolyzed Reactive Red 23 with from 0 to 100% hydroxy form and from 0 to 100% vinyl form

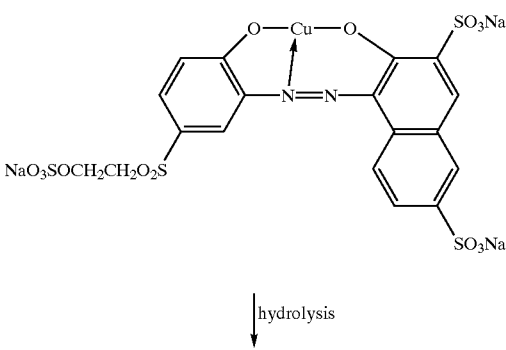

| hydrolysis

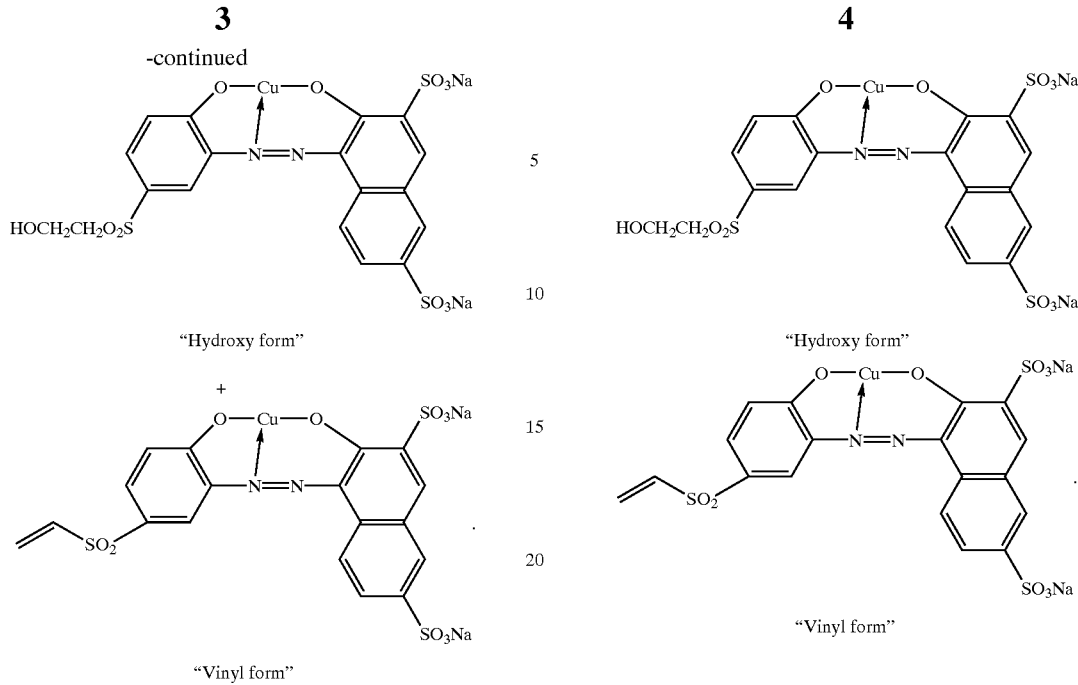

"Hydroxy form"

"Vinyl form"

DETAILED DESCRIPTION OF THE INVENTION

The present invention described herein is directed to ink-jet inks for printing inkjet images using commercially available ink-jet printers such as, for example but not limited to, HP DeskJet® printers, manufactured by Hewlett-Packard Company, of Palo Alto, Calif. The inks enable production of near photographic images having little or no coalescence, excellent waterfastness, and reduced dry time, on a range of print media, in particular, for example but not limited to, plain white, 8 ½"×11", 20 lb. weight, printer paper conventionally used for office and home computers.

RR23 is a very lightfast dye. The reactive portion of this dye molecule will hydrolyze over time in an aqueous solution. It is known that when the reactive group of other inkjet dyes (Reactive Red 180 and Reactive Black 31) is hydrolyzed overtime, pH instability over the life of the ink has resulted. The pH change and salts formed during hydrolysis over time increase the occurrence of kogation, decap and lighffastness problems in an ink containing a reactive dye.

The present inventor has found that when RR23 is passivated initially by hydrolyzing the reactive sulfate group of the dye that a more stable dye results with better characteristics of pH stability, kogation, decap and lightfastness. The passivation can occur under acid or alkaline conditions. In a preferred embodiment the passivation occurs under alkaline conditions and in a more preferred embodiment the passivation occurs at a pH of at least 9.

In one embodiment, the present invention relates to a high lighffastness magenta dye comprising hydrolyzed Reactive Red 23 with from 0 to 100% hydroxy form and from 0 to 100% vinyl form:

In a preferred embodiment of the high lighffastness magenta dye of the present invention, at least 50% of the hydrolyzed Reactive Red 23 is the hydroxy form.

In another embodiment, the present invention relates to a set of ink-jet inks for ink-jet printing, at least one of the inks being a magenta ink comprising a high lightfastness magenta dye, the high lightfastness magenta dye comprising hydrolyzed Reactive Red 23 with from 0 to 100% hydroxy form and from 0 to 100% vinyl form:

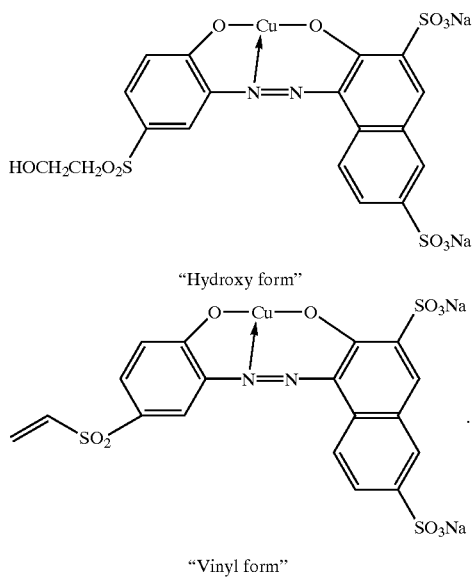

"Hydroxy form"

"Vinyl form"

In a preferred embodiment of the set of ink-jet inks of the present invention, at least 50% of the hydrolyzed Reactive Red 23 is the hydroxy form.

In another preferred embodiment of the set of ink-jet inks of the present invention, at least one of the inks is a cyan ink comprising a cyan dye; and at least one of the inks is a yellow ink comprising a yellow dye.

In yet another embodiment, the present invention relates to a method of making a passivated form of Reactive Red 23 comprising hydrolyzing Reactive Red 23 to obtain hydrolyzed Reactive Red 23 with from 0 to 100% hydroxy form and from 0 to 100% vinyl form.

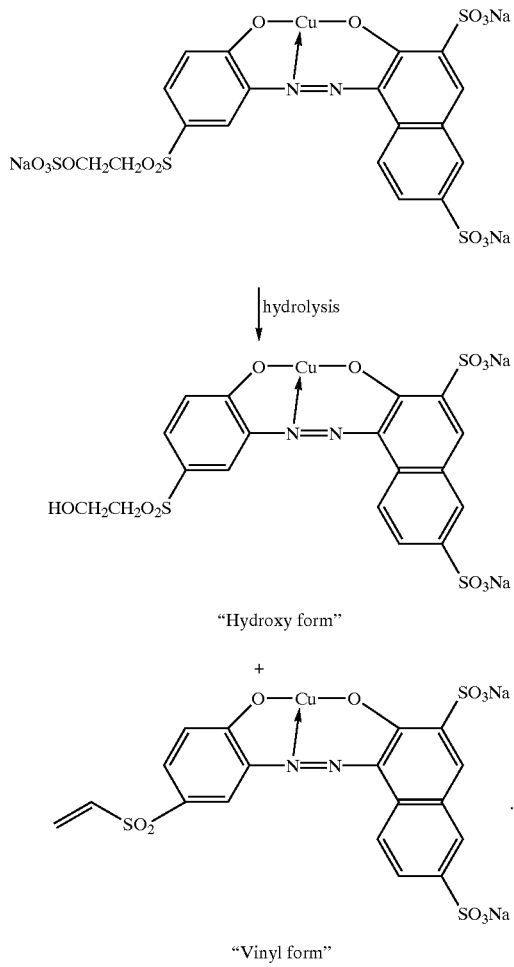

"Hydroxy form"

+

"Vinyl form"

In a preferred embodiment of the method of the present invention, hydrolyzing the Reactive Red 23 is conducted at a pH of at least 9.

In another preferred embodiment of the method of the present invention, at least 50% of the hydrolyzed Reactive Red 23 is the hydroxy form.

EXAMPLES

Example 1

The extent of real time fade of inkjet printed samples of passivated Reactive Red 23 was compared directly to similar inkjet printed samples of Magenta 377. Real time fade was measured by determining the original optical density of the inkjet printed samples and the faded optical density of the samples after 7.5 months of exposure to office light. The results are shown in the following table. Reactive red 23 was shown to fade 37% in 7.5 months, while Magenta 377 faded 86% under the same conditions.

TABLE 1

| | Fade after 7.5 months of office light | | |
|---|---|---|---|
| Sample | Original OD | after fade OD | % fade |
| M377 | 1.76 | 0.24 | 86% |
| RR23 | 1.27 | 0.8 | 37% |

Example 2

The extent of accelerated fade of inkjet printed samples of passivated Reactive Red 23 was compared directly to similar inkjet printed samples of Magenta 377 and Pro-Jetm Fast Magenta 2. Accelerated fade was measured by determining the % optical density fade of the inkjet-printed samples at 3 months and 6 months accelerated fade. The results are shown in the following Table 2. Reactive red 23 was shown to fade 37% in 7.5 months, while Magenta 377 faded 86% under the same conditions.

TABLE 2

| Accelerated Fade after 3 and 6 months of office light | | |
|---|---|---|
| Sample | 3 month fade OD | 6 month fade |
| M377 | 6% | 7% |
| pro-jet ™ Fast Magenta 2 | 30% | 43% |
| RR23 | 1% | 4% |

Example 3

Samples of RR23 were prepared under various conditions of pH and temperature. The area count @ 530 nm was measured at 1.2 minutes, 3.3 minutes and 5.4 minutes for the samples under the various conditions and from the Area Count measurements the percentages in each sample of Reactive Form (MW 673), Hydroxy Form (MW 593) and Vinyl Form (MW 575) were determined at the various conditions. The results are given below in Table 3.

TABLE 3

| | Area Count @ 530 nm | | | Percentage (%) | | |
|---|---|---|---|---|---|---|
| Sample ID RR 23 | Reactive Form (MW 673) | Hydroxy Form (MW 593) | Vinyl Form (MW 575) | Reactive Form (MW 673) | Hydroxy Form (MW 593) | Vinyl Form (MW 575) |
| Retention Time (min) | 1.2 | 3.3 | 5.4 | | | |
| Starting Dye (powder) | 9196 | 428 | 2694 | 74.7 | 3.5 | 21.9 |
| pH = 7 ambient 2 weeks | 8121 | 932 | 9862 | 42.9 | 4.9 | 52.1 |

TABLE 3-continued

| | Area Count @ 530 nm | | | Percentage (%) | | |
|---|---|---|---|---|---|---|
| Sample ID RR 23 | Reactive Form (MW 673) | Hydroxy Form (MW 593) | Vinyl Form (MW 575) | Reactive Form (MW 673) | Hydroxy Form (MW 593) | Vinyl Form (MW 575) |
| pH = 7 ASL 2 weeks | 0 | 2105 | 17253 | 0.0 | 10.9 | 89.1 |
| pH = 4 ASL 2 weeks | 12633 | 572 | 4177 | 72.7 | 3.3 | 24.0 |
| pH = 9 ASL 2 weeks | 3322 | 14978 | 262 | 17.9 | 80.7 | 1.4 |

Example 4

Inkjet inks of RR23 and M377 were printed on HP Professional Brochure paper. Percent fade was measured after 2 years. Results are given below in Table 4.

TABLE 4

| % Fade at 2 years on HP Professional Brochure paper | |
|---|---|
| RR23 | 5% |
| M377 | 38% |

Example 5

Two digital colored photographs were printed on HP Premium Photoglossy paper. The only difference in the two photographs was with the dark magenta ink that was used. The dark magenta ink used in the photographs was either dark magenta of M377 or of RR23. Years of life for magenta, neutral patch, red and blue were measured in each photograph and shown below in Table 5.

TABLE 5

| Years of life using dark magenta (M377 and RR23) on HP Premium Photoglossy | | | | |
|---|---|---|---|---|
| | Magenta | Neutral patch | Red | Blue |
| M377 | 5.5 | 5.5 | 5.5 | 4.8 |
| RR23 | 7.5 | 7.5 | 9 | 7.5 |

While the foregoing invention has been described in some detail for purposes of clarity and understanding, it will be clear to one skilled in the art from the reading of this disclosure that various changes in form and detail can be made without departing from the true scope of the invention.

What is claimed is:

1. A high lighffastness magenta dye comprising hydrolyzed Reactive Red 23 with from 0 to 100% hydroxy form and from 0 to 100% vinyl form of hydrolyzed Reactive Red 23:

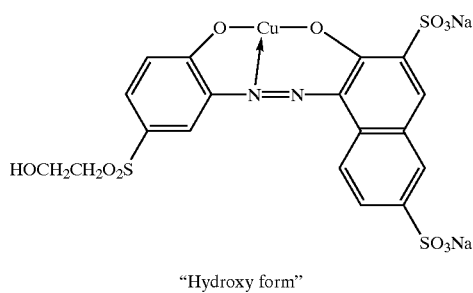

"Hydroxy form"

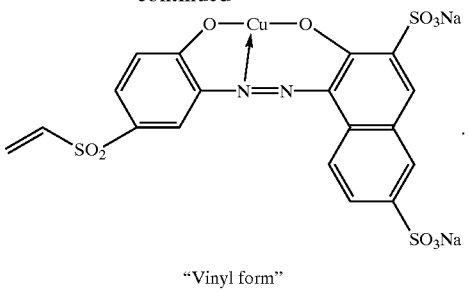

"Vinyl form"

3. The high lighffastness magenta dye of claim 1, wherein at least 50% of the hydrolyzed Reactive Red 23 is the hydroxy form.

3. A set of ink-jet inks for ink-jet printing, at least one of the inks being a magenta ink comprising a high lightfastness magenta dye, the high lightfastness magenta dye comprising hydrolyzed Reactive Red 23 with from 0 to 100% hydroxy form and from 0 to 100% vinyl form:

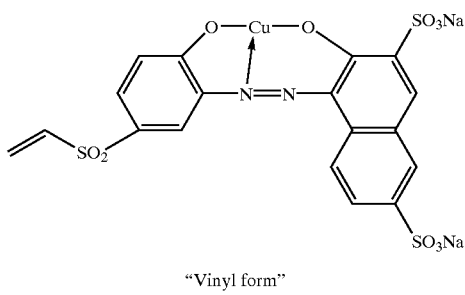

"Vinyl form"

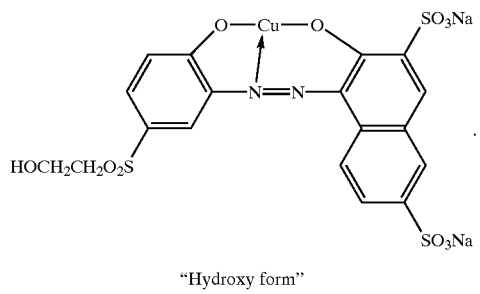

"Hydroxy form"

4. The set of ink-jet inks of claim 3, wherein at least 50% of the hydrolyzed Reactive Red 23 is the hydroxy form.

5. The set of ink-jet inks according to claim 3, at least one of the inks being a cyan ink comprising a cyan dye; and at least one of the inks being a yellow ink comprising a yellow dye.

6. A method of making a passivated form of Reactive Red 23 comprising hydrolyzing Reactive Red 23 to obtain hydrolyzed Reactive Red 23 with from 0 to 100% hydroxy form and from 0 to 100% vinyl:

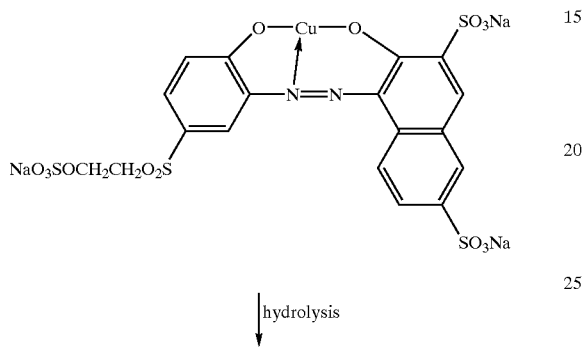

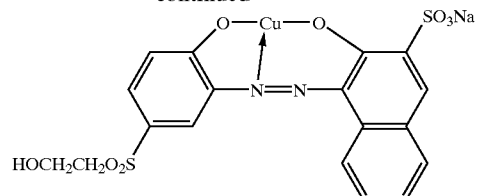

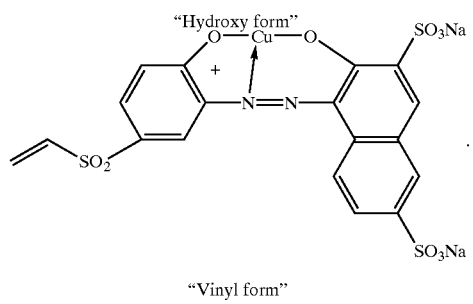

"Vinyl form"

7. The method according to claim 6 wherein hydrolyzing the Reactive Red 23 is conducted at a pH of at least 9.

8. The method according to claim 6 wherein at least 50% of the hydrolyzed Reactive Red 23 is the hydroxy form.

* * * * *

UNITED STATES PATENT AND TRADEMARK OFFICE
CERTIFICATE OF CORRECTION

PATENT NO. : 6,458,195 B1  Page 1 of 1
DATED : October 1, 2002
INVENTOR(S) : Stoffel et al.

It is certified that error appears in the above-identified patent and that said Letters Patent is hereby corrected as shown below:

Column 7,
Line 51, delete "lighffastness" and insert therefor -- lightfastness --.

Column 8,
Line 29, delete "3." and insert therefor -- 2. --.
Line 29, delete "lighffastness" and insert therefor -- lightfastness --.

Column 10,
Line 10, insert -- + -- in the middle of the line.
Line 14, delete "+" from the middle of the line.

Signed and Sealed this

Second Day of December, 2003

JAMES E. ROGAN
*Director of the United States Patent and Trademark Office*